(12) United States Patent
Nguyen et al.

(10) Patent No.: US 7,566,244 B1
(45) Date of Patent: Jul. 28, 2009

(54) SUPPORTING A PLUGGABLE TRANSCEIVER MODULE

(75) Inventors: Toan Nguyen, San Jose, CA (US); Gary Myers, San Ramon, CA (US); Jimmy Leung, Fremont, CA (US); Saeed Seyed, Los Altos Hills, CA (US); Michael Chern, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/801,588

(22) Filed: May 10, 2007

(51) Int. Cl.
*H01R 13/648* (2006.01)

(52) U.S. Cl. ...................................... 439/607; 439/352

(58) Field of Classification Search .................. 439/607, 439/352–358
See application file for complete search history.

(56) References Cited

U.S. PATENT DOCUMENTS

| | | | |
|---|---|---|---|
| 5,757,998 A * | 5/1998 | Thatcher et al. ............... | 385/75 |
| 6,328,590 B1 | 12/2001 | Linnell | |
| 6,430,053 B1 * | 8/2002 | Peterson et al. ............. | 361/728 |
| 6,558,191 B2 * | 5/2003 | Bright et al. ............. | 439/541.5 |
| 6,705,764 B2 | 3/2004 | Shang | |
| 6,731,519 B1 * | 5/2004 | Hwang ....................... | 361/818 |
| 6,762,940 B2 * | 7/2004 | Zaremba ..................... | 361/728 |
| 6,824,416 B2 | 11/2004 | Di Mascio | |
| 6,890,206 B2 * | 5/2005 | Distad et al. ................ | 439/372 |
| 6,991,481 B1 | 1/2006 | Guan et al. | |
| 7,070,446 B2 * | 7/2006 | Henry et al. ............. | 439/541.5 |
| 7,357,673 B2 * | 4/2008 | Long .......................... | 439/608 |
| 7,433,193 B2 | 10/2008 | Yee et al. | |
| 2005/0003696 A1 * | 1/2005 | Shirk et al. ................. | 439/352 |
| 2007/0054551 A1 * | 3/2007 | Malagrino et al. .......... | 439/607 |
| 2008/0102699 A1 * | 5/2008 | Chen .......................... | 439/607 |

* cited by examiner

*Primary Examiner*—Renee S Luebke
*Assistant Examiner*—Larisa Tsukerman
(74) *Attorney, Agent, or Firm*—BainwoodHuang (57) ABSTRACT

A circuit board assembly includes a circuit board, and a connector supported by the circuit board. The connector is configured to electrically connect with a pluggable transceiver module having a retention post. The circuit board assembly further includes a cage supported by the circuit board. The cage includes a cage body defining (i) a circuit board side which faces the circuit board, (ii) an opposing side which faces away from the circuit board, and (iii) a cavity within which the module substantially resides during module operation. The connector is substantially disposed within the cavity. The cage further includes a tab is configured to engage the retention post of the module when the module substantially resides within the cavity defined by the cage body. The tab resides on the opposing side defined by the cage body. Such an assembly enables installation of the module with its belly side up.

15 Claims, 5 Drawing Sheets

SUPPORTING A PLUGGABLE TRANSCEIVER MODULE

BACKGROUND

A typical fiber optic transceiver is configured to transmit and receive fiber optic signals, e.g., through a set of fiber optic cables. Such a device typically attaches to a circuit board via a metallic rail or a cage which fastens directly to the circuit board. The metallic rail or cage provides mechanical stability as well as electromagnetic interference (EMI) shielding to the transceiver.

One conventional transceiver configuration involves a metallic cage and a pluggable transceiver module. The metallic cage mounts to a circuit board, and has a locking tab which is disposed on a side of the metallic cage which is flush with the circuit board. The pluggable transceiver module has a retention post which extends from a belly side of the pluggable transceiver module and which is configured to lock with the locking tab of the metallic cage. The pluggable transceiver module further has a latch or bail which receives actuation on the module side which is opposite to the belly side of the pluggable transceiver module.

During installation of the pluggable transceiver module, the pluggable transceiver module inserts into the metallic cage so that the belly side faces the circuit board and so that the retention post locks onto the locking tab of the metallic cage. To remove the pluggable transceiver module from the metallic cage, the latch or bail actuates toward the circuit board to unlock the retention post from the locking tab and thus free the pluggable transceiver module from the cage.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Unfortunately, there are deficiencies to the above-described conventional pluggable transceiver configuration which involves installation of the pluggable transceiver module so that so that the belly side of the module faces the circuit board. For example, the above-described conventional transceiver configuration is not well-suited for use in a two dimensional array configuration in which one row of transceiver modules installs into a first cage on a motherboard and a second row of transceiver modules installs into a second cage on a daughter board with the first and second cages substantially abutting each other between the motherboard and the daughter card. In such a configuration, the latches/bails of the transceiver modules are positioned between the transceiver modules and are thus difficult to actuate due to their proximity to each other. That is, the latches/bails of the transceiver modules of the first row are very close to the latches/bails of the transceiver modules of the second row. Accordingly, it is difficult to properly reach and maneuver a particular latch/bail without interfering with an adjacent latch/bail.

Moreover, some fiber optic cables include connectors with movable flaps which facilitate actuation of the latches/bails to disconnect the pluggable transceiver modules from the cages. In the context of the above-described two dimensional array of transceiver modules, the movable flaps of the fiber optic cables are positioned along with the latches/bails between the cable connectors and are similarly difficult to grasp due to their proximity to each other. That is, the movable flaps of the cables along the first row are very close to the movable flaps of the cables along the second row. Thus, it is difficult to properly reach and actuate a particular movable flap without interfering with an adjacent flap.

One possible alternative is to create a single cage which holds a two dimensional array of pluggable transceiver modules in a manner such that the latches of the modules and the movable flaps of the cables face away from each other. However, such an alternative would require a specialized circuit board connector which is capable of connecting to a first transceiver module on the first row and a second transceiver module on the second row. Unfortunately, the distance to the pluggable transceiver module which is furthest from the circuit board is too long for electrical pathways capable of achieving certain high speed bandwidth (e.g., 10 Gigabits/second). Accordingly, such a specialized circuit board connector is not practical for very high speed operation.

Another possible alternative is to mount a cage containing a single row of transceiver modules onto a motherboard, mount an identical cage containing a single row of transceiver modules onto a daughter card, and then stack the daughter card on top of the motherboard so that the transceiver modules for the motherboard have the same orientation as the transceiver modules for the daughter card (e.g., each cage rests on the top surface of its board). Here, there latches/bails of the transceiver modules and the movable flaps of the fiber optic cables all point in the same direction (e.g., up) for easier access. Unfortunately, this alternative suffers because there is not very good clearance between the cage mounted to the motherboard and the bottom space under the daughter card for mounting of high speed circuitry (e.g., high power/speed ASICs) close to the pluggable transceiver modules of the daughter card. Additionally, it may be impractical or impossible to increase the distance between the motherboard and the daughter card due to other geometric restrictions (e.g., restrictions on overall chassis dimensions).

In contrast to the earlier-described conventional transceiver configuration which involves installation of a pluggable transceiver module so that so that the belly side and the retention post of the module faces the circuit board, an improved cage is constructed and arranged to hold a pluggable transceiver module in a reverse orientation, e.g., upside down so that the belly and the retention post of the pluggable transceiver module faces away from the circuit board. With such an improved cage in combination with an appropriate electrical connector, a two dimensional array of pluggable transceiver modules can be conveniently sandwiched between a motherboard and a daughter card. In particular, both the latches/bails of the modules and the movable flaps of the cables would then face away from each other for easy access and actuation. Moreover, circuit board real estate on the opposite sides of the motherboard and the daughter card would be available for convenient and close location of high speed circuitry near the modules.

One embodiment is directed to a circuit board assembly having a circuit board, and a connector supported by the circuit board. The connector is configured to electrically connect with a pluggable transceiver module having a retention post. The circuit board assembly further has a cage supported by the circuit board. The cage includes a cage body defining (i) a circuit board side which faces the circuit board, (ii) an opposing side which faces away from the circuit board, and (iii) a cavity within which the module substantially resides during module operation. The connector is substantially disposed within the cavity. The cage further includes a tab is configured to engage the retention post of the module when the module substantially resides within the cavity defined by the cage body. The tab resides on the opposing side defined by the cage body. Such an assembly allows the module to install into the assembly with the retention post facing up and away from the circuit board (i.e., belly side out) to provide convenient access to certain movable parts (e.g., movable flaps of fiber optic cables, module latches or bails, etc.) in an arrangement involving a two dimensional array of pluggable transceiver modules.

DESCRIPTION OF EXAMPLE EMBODIMENTS

Figure 1:
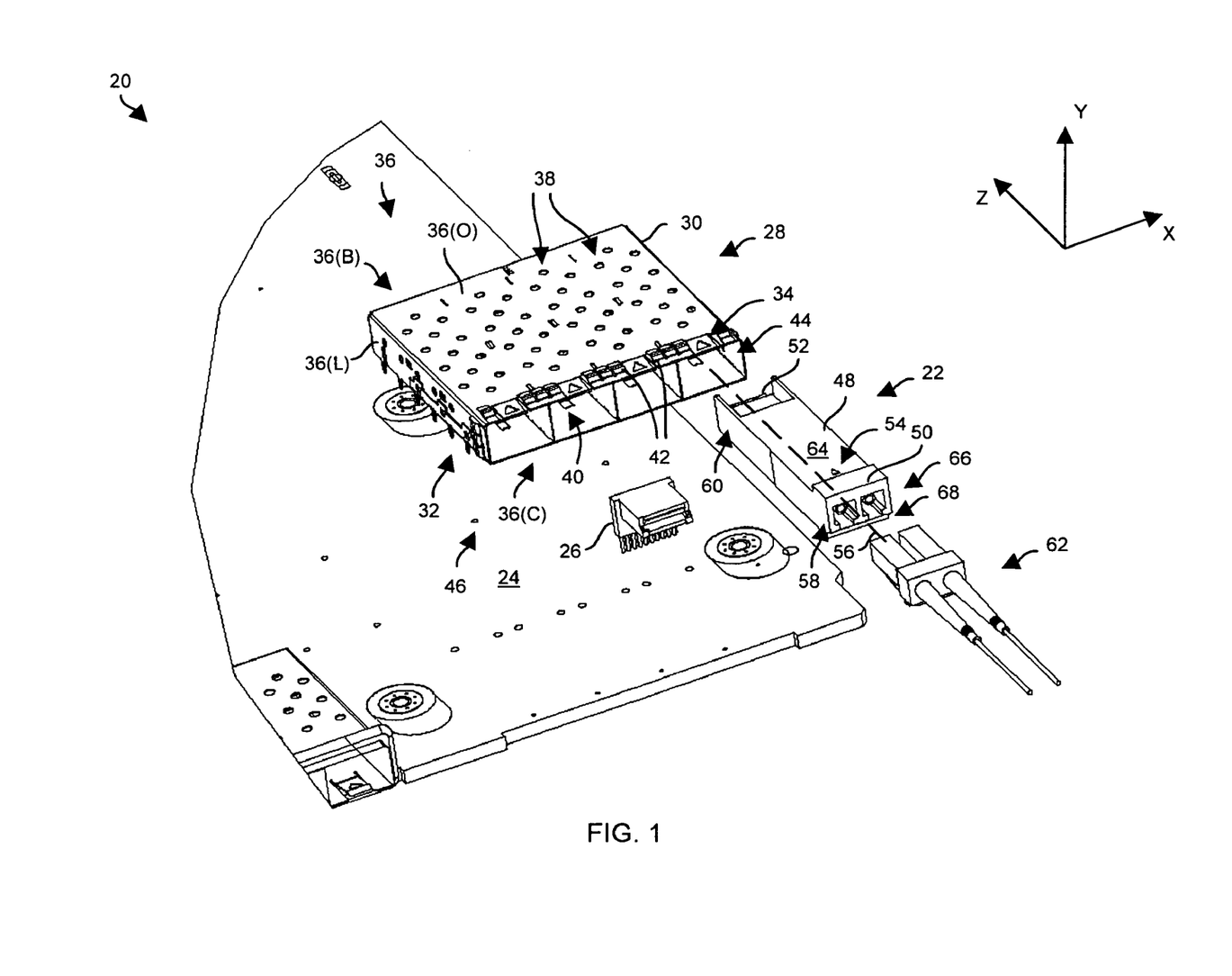
FIG. 1 is an exploded perspective view of a circuit board assembly which is configured to support a pluggable transceiver module.

FIG. 1 shows an exploded perspective view of a circuit board assembly 20 which is configured to support a pluggable transceiver module 22. The circuit board assembly 20 includes, among other things, a circuit board 24, a set of pluggable transceiver module connectors 26 (only one being shown in FIG. 1 for simplicity), and a metallic cage 28. The circuit board 24 is substantially planar in shape (in the X-Z plane) and is configured to mechanically support the connector 26, the metallic cage 28 and the pluggable transceiver module 22 via the cage 28. It should be understood that the circuit board 24 includes a variety of other components (e.g., electronic circuitry such as integrated circuit devices, discrete components, daughter cards, etc.) which are not shown in FIG. 1 for simplicity. Moreover, the circuit board 24 is capable of supporting an additional set of connectors 26 and cages 28 to form a high density configuration.

The metallic cage 28 includes a cage body 30, a set of electrical contacts 32 and a set of tabs 34. The cage body 30 defines a circuit board side 36(C) which faces the circuit board 24, an opposing side 36(O) which faces away from the circuit board 24, lateral sides 36(L), and a back side 36(B). Each of the sides 36(C), 36(O), 36(L), 36(B) (collectively, sides 36) preferably provides venting holes 38 which enable heat dissipation but which are sized small enough to provide reliable EMI shielding at high frequencies.

The cage body 30 further defines cavities 40 within which the pluggable transceiver modules 22 substantially reside during module operation. It should be understood that the metallic cage 28 preferably includes additional features 42 (e.g., metallic fingers) for robust EMI gasketing around the openings 44 to the cavities 40.

The electrical contacts 32 extend from the circuit board side 36(C) defined by the cage body 30 toward the circuit board 28 to mechanically mount and electrically connecting the cage body 30 to the circuit board 24. In some arrangements, the contacts 32 are compression fit pins (e.g., eye of the needle pins, posts with a cross-sectional C shape, etc.) which are integrally formed with the cage body 30. The multiple compression fit pins mate with respective plated through holes (or vias) 46 of the circuit board 24 (e.g., when the cage 28 is moved in the negative Y-direction to engage the circuit board 24). Once the cage 28 is attached to the circuit board 24, the connectors 26 are substantially disposed (e.g., reliably protected and shielded) within respective cavities 40 defined by the cage body 30. Accordingly, the circuit board assembly 20 is well-equipped to operate with multiple modules 22.

The tabs 34 reside on the opposing side 36(O) defined by the cage body 30. As will be explained in further detail shortly, each tab 34 controls release of a pluggable transceiver module 22 from a respective cavity 40.

As further shown in FIG. 1, the pluggable transceiver module 22 includes an elongated housing 48, an optical interface portion 50, and an electrical interface portion 52, and a retention post 54. The elongated housing 48 defines an axis 56 (e.g., substantially parallel to the Z-axis in FIG. 1) along which the module 22 substantially travels when inserting into and exiting from the cage 28. The optical interface portion 50 is disposed at first end 58 of the elongated housing 48. The electrical interface portion 52 disposed at a second end 60 of the elongated housing 48 which is substantially opposite the first end 58. The optical interface portion 50 is constructed and arranged to optically interface with a fiber optic cable 62. The electrical interface portion 52 is constructed and arranged to electrically interface with a pluggable transceiver module connector 26. The retention post 54 extends outwardly in the Y-direction from a belly 64 of the module 22. In the context of the assembly 20, the cage 28 is configured to carry the module 22 so that the retention post 54 faces away from the circuit board 24 as shown in FIG. 1.

It should be understood that the retention post 54 of the module 22 engages with a respective tab 34 when the module 22 plugs into one of the cavities 40 defined by the cage body 30. Once such engagement occurs, the module 22 remains mechanically captured within the cage body 30, and reliably connected to a respective connector 26.

It should be further understood that the module 22 is capable of including additional features such as a control lever (or latch or bail) 66 (shown only generally by the arrow 66 for simplicity) which attaches to the optical interface portion 50 and which is operable (e.g., receives actuation) at a location 68. The control lever 66 is constructed and arranged to effectuate disengagement of the retention post 54 from the tab 34 during actuation. For example, a user is capable depressing the control lever 66 at the location 68 to push back the tab 34. As a result, the module is then free to be removed from the cage 28.

By way of example only, the cage 28 is shown as being constructed and arranged to carry a row of four pluggable transceiver module 22. Other arrangements are suitable as well such as 1×1, 1×2, 1×6, and so on. Further details will now be provided with reference to FIG. 2.

Figure 2:
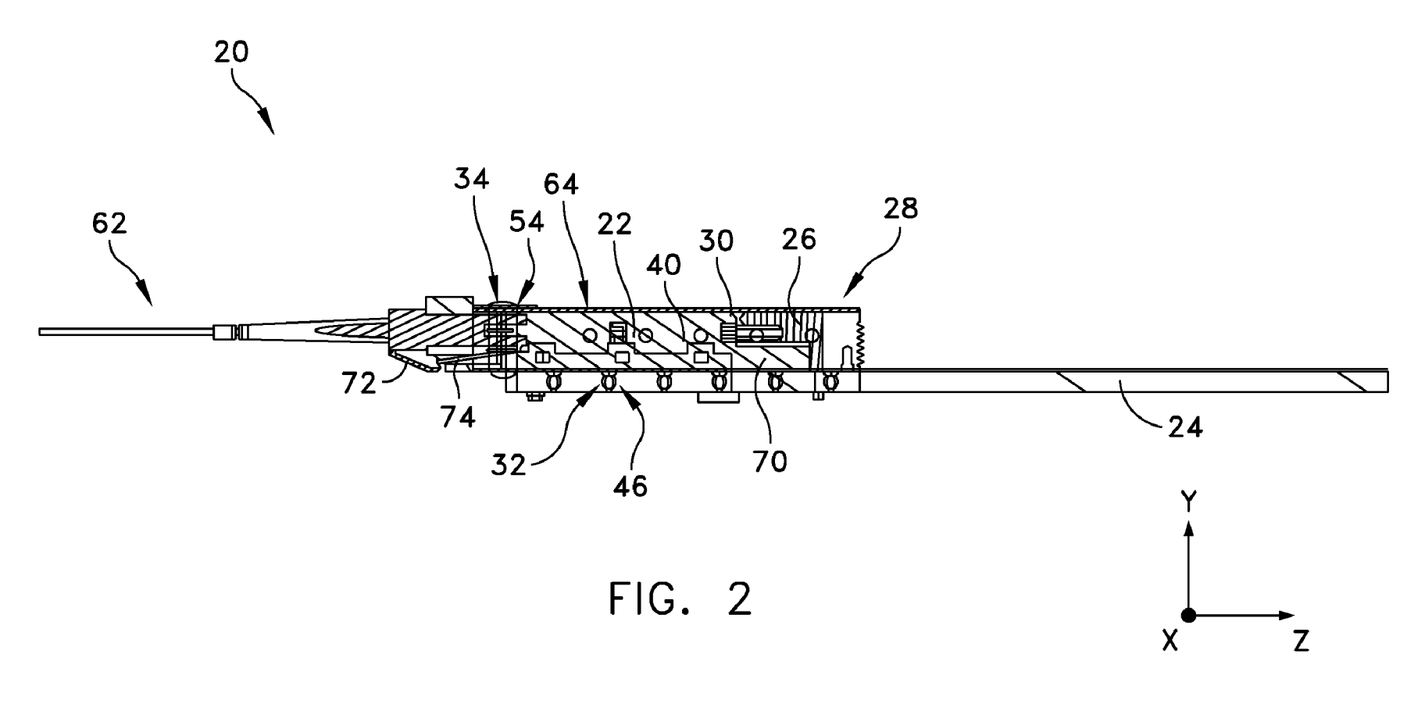
FIG. 2 is a cross-sectional side view of the circuit board assembly of FIG. 1 in assembled form.

FIG. 2 is a cross-sectional side view of the circuit board assembly 20 in assembled form. A pluggable transceiver module 22 has be installed within a cavity 40 defined by the cage 28. The optical interface portion 50 of the module 22 is optically mated with the fiber optic cable 62 (also see FIG. 1). Additionally, the electrical interface portion 52 is electrically mated with a connector 26 within the cavity 40. Furthermore, the retention post 54 of the module 22 extends outwardly in the positive Y-direction from the belly 64 of the module 22 and away from the circuit board 24 to physically retain the module 22 within the cavity 40.

From this perspective, it should be clear that the electrical interface portion 52 of the module 22 slides into the connector 26 which is mounted on the circuit board 24. In some arrangements, the electrical interface portion 52 is the edge of a miniature circuit board which is housed within the elongated housing 48 of the module and which extends from the housing for slidable engagement with the connector 26 (also see FIG. 1). Metallic pads along the circuit board edge then wipe against corresponding contacts within the connector 26 for reliable mechanical and electrical contact.

It should also be clear that the arrangement shown in FIGS. 1 and 2 has significant differences than conventional module positioning approaches which involve the belly 64 of the module 22 facing the circuit board. In such a conventional approaches, the contacts of the circuit board connector are purposefully designed to be lower or closer to the circuit board in order to properly mate with a module with its belly facing the circuit board and to minimize the lengths of the electrical pathways to the electrical interface portion 52 of the module 22. Unfortunately, in such a conventional approach, control members such as module latches or bails and movable flaps of fiber optic cables face away from the circuit board thus preventing easy and convenient access to such control members in certain two dimensional array settings.

However, in the orientations shown in FIGS. 1 and 2, part 70 of the elongated housing 48 extends underneath the electrical interface portion 52. This situation requires the connector 26 to be slightly taller from the circuit board 24 and the electrical pathways within the connector 26 to be slightly longer and deeper than in a conventional approach with a lower height connector. Nevertheless, an advantage of the arrangement shown in FIGS. 1 and 2 is that the control members of the module 22 and the fiber optic cable 62 face the circuit board 24 since the module 22 and the fiber optic cable 62 are essentially upside down from their conventional orientation to a circuit board. For illustration purposes, a movable flap 72 is shown in FIG. 2 extending from the end of the fiber optic cable 62 toward the circuit board 24 (i.e., in the negative Y-direction) rather than away from the circuit board 24 (i.e., the positive Y-direction). The movable flap 72 is constructed and arranged to provide actuation to a control lever 74 (e.g., a latch or bail) of the module 22 for actuation resulting in module release. Further details will now be provided with reference to FIG. 3.

Figure 3:
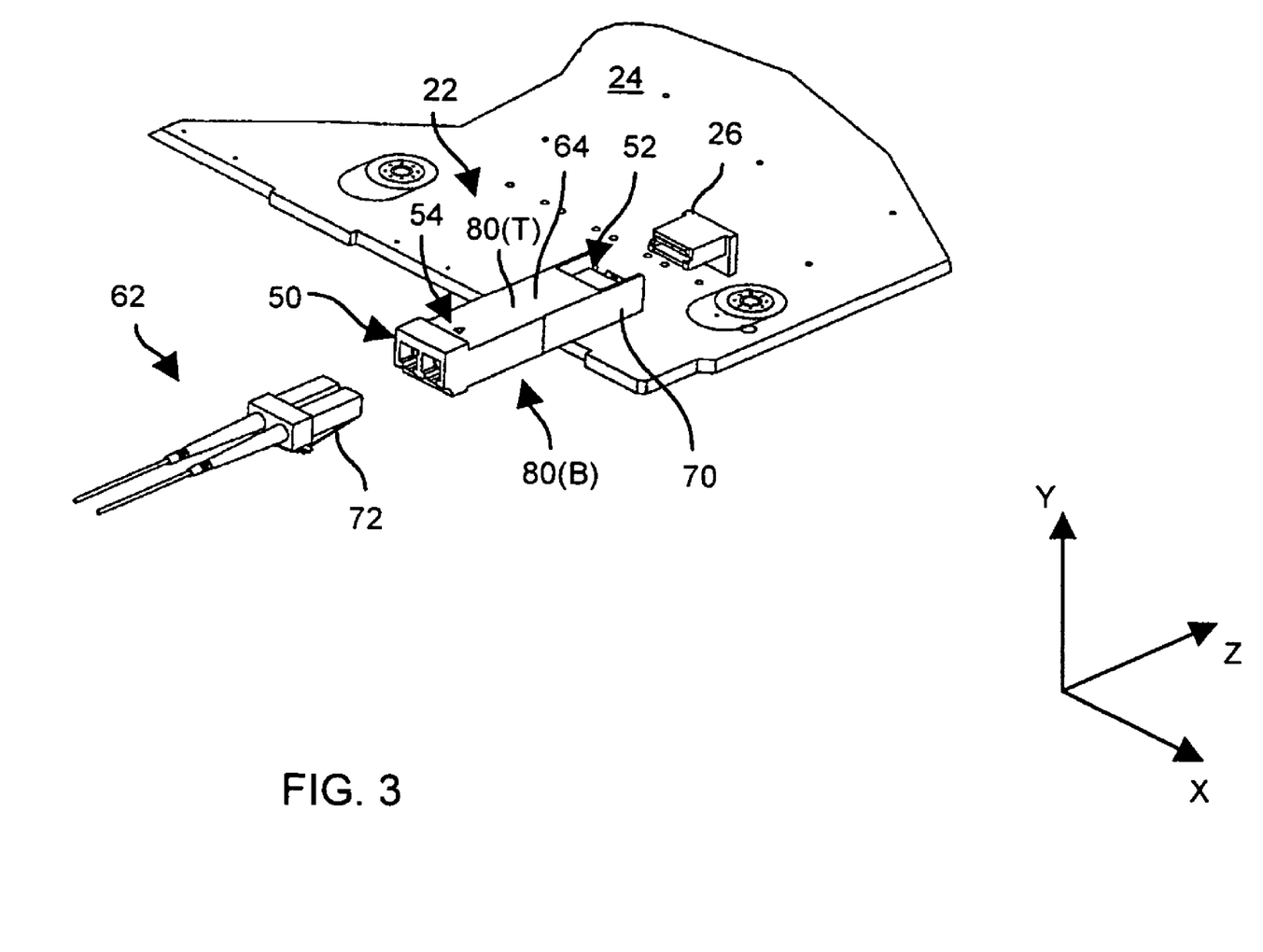
FIG. 3 is a perspective view of a portion of the circuit board assembly of FIG. 1 illustrating a particular connection feature.

FIG. 3 is a perspective view of a particular components of the circuit board assembly 20 illustrating further details of the connector 26, the module 22 relative to the circuit board 24 and the fiber optic cable 62. The cage 28 has been omitted from view in FIG. 3 so that the proper alignment of these particular components can be better illustrated.

As shown in FIG. 3, the pluggable transceiver module 22 has a top surface 80(T) (also see the belly 64 in FIGS. 1 and 2) and a bottom surface 80(B) which is opposite the top surface 80(T). The bottom surface 80(B) faces the circuit board 24 and the top surface 80(T) faces away from the circuit board 24 when the module 22 properly connects with the mounted connector 26.

The retention post 54 of the module 22 resides on the top surface 80(T) and extends away from the module 22 in the positive Y-direction. Moreover, retention post 54 faces away from the circuit board 24 when the module 22 properly connects with the mounted connector 26.

As a result of the orientation of the module 22, it should be clear that the connector 26 is constructed and arranged to enable the module 22 to essentially connect in an upside down manner from the traditional orientation for the module. That is, the belly 64 and the retention post 54 point away from the circuit board 24. Accordingly, control members such as a movable flap 72 of the fiber optic cable 62 and the control lever 74 of the module 22 (FIG. 2) point in the direction toward the circuit board 24 (i.e., the negative Y-direction). Further details will now be provided with reference to FIGS. 4 and 5.

Figure 4:
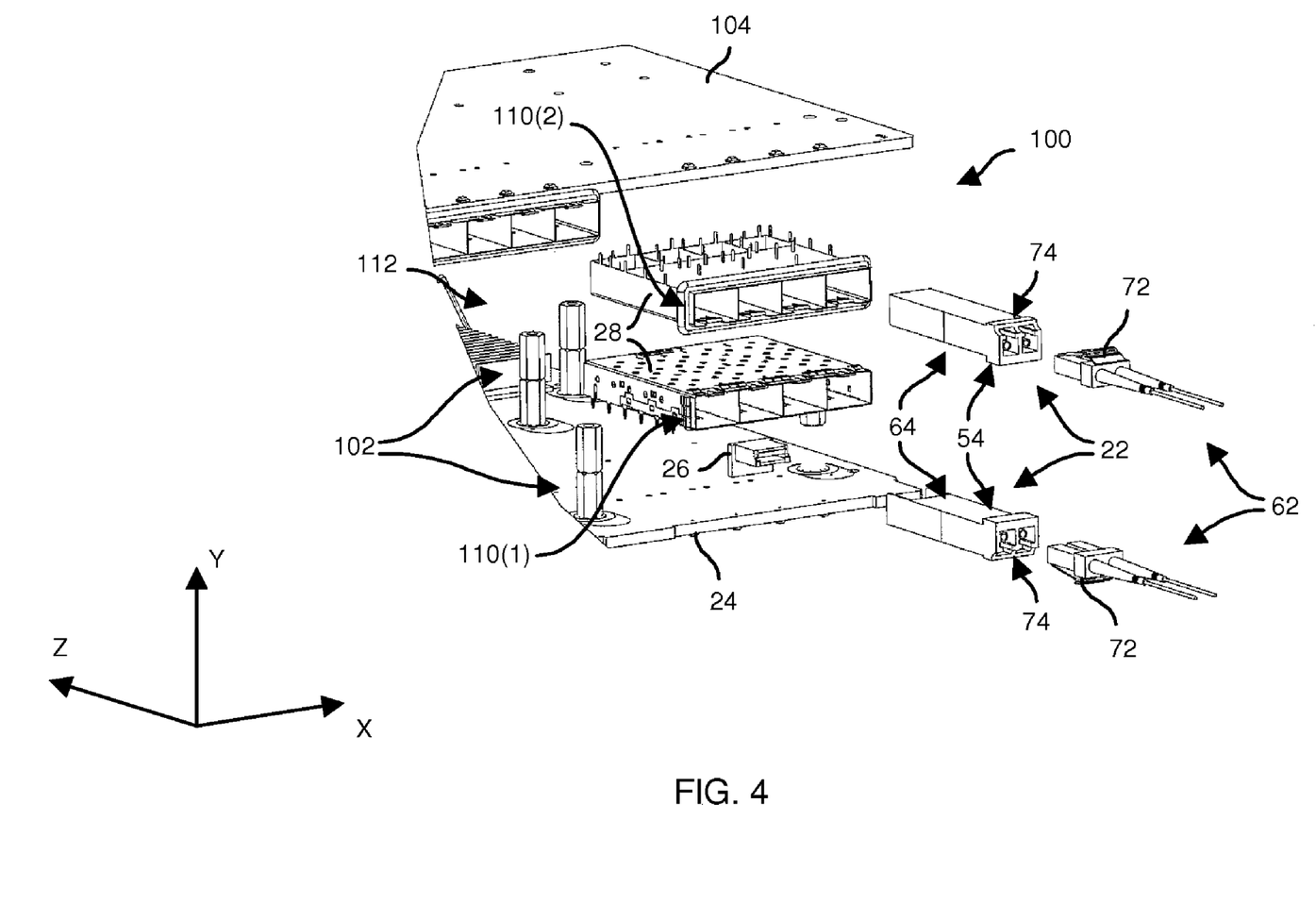
FIG. 4 is an augmented circuit board assembly which includes a motherboard and a daughter card in combination with multiple metallic cages.
Figure 5:
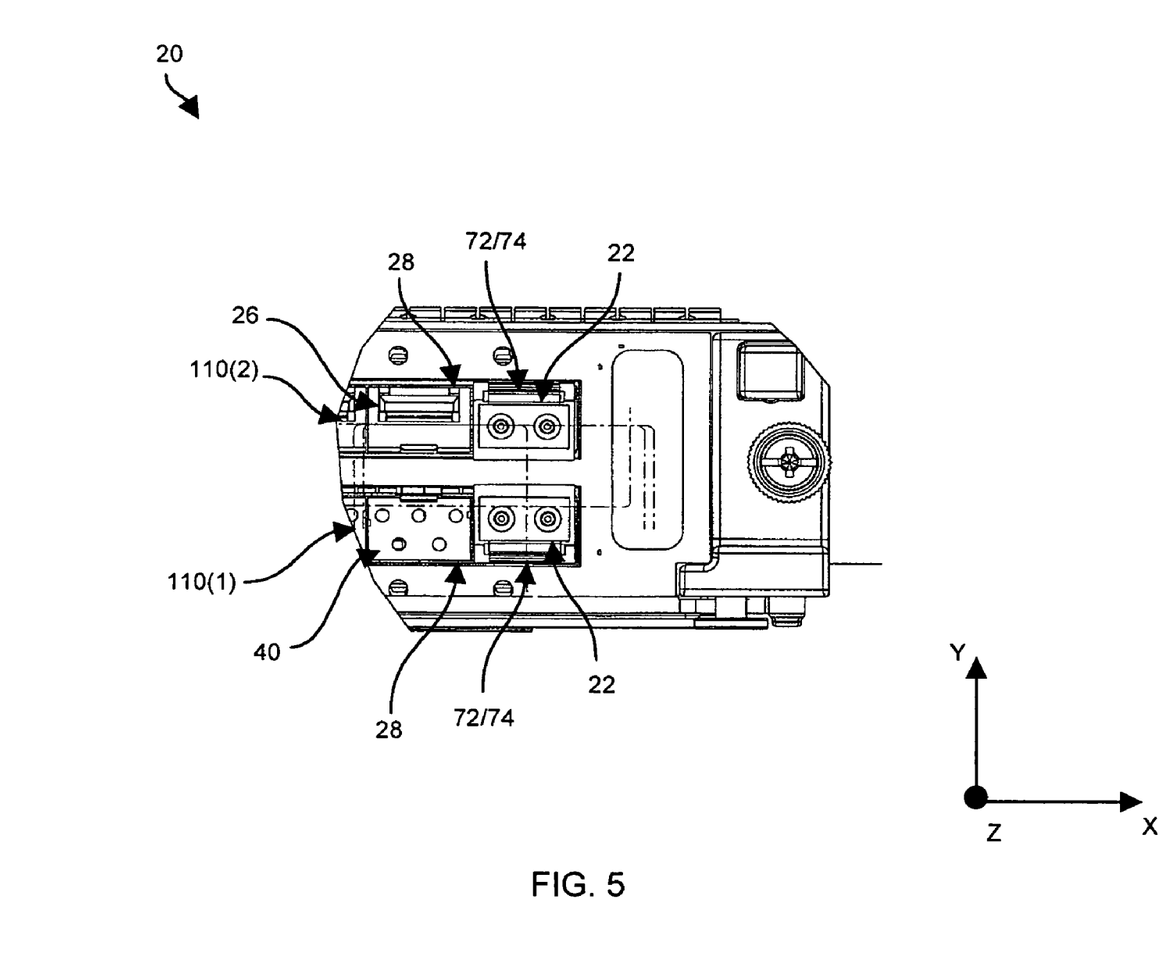
FIG. 5 is a front view of the augmented circuit board assembly of FIG. 4.

FIGS. 4 and 5 illustrate the circuit board assembly 20 with additional components. FIG. 4 is an exploded perspective view of the circuit board assembly 20. FIG. 5 is an assembled front view of a detailed portion of the circuit board assembly 20.

As shown in FIGS. 4 and 5, the circuit board assembly 20 further includes a daughter card assembly 100 and a set of standoffs and connectors 102. In this arrangement, the circuit board 24 is essentially in a motherboard role (i.e., a larger, main supporting structure) relative to the daughter card assembly 100. The daughter card assembly 100 includes a daughter card 104, another set of connectors that may preferably be the same type of connectors as connectors 26 of circuit board 24, and another metallic cage 28 in an "under mount" arrangement. The standoffs and connectors 102 mechanically and electrically connect the daughter card 104 to the circuit board 24 to form a reliable, cohesive electronic network of electrical pathways. Accordingly, additional pluggable transceiver modules 22 and fiber optic cables 62 are capable of connecting with the circuit board assembly 20 an operating together in a high density manner.

As shown in FIGS. 4 and 5, the cages 28 are sandwiched between the daughter card 104 and the main circuit board 24. Accordingly, the modules 22 and fiber optic cables 62 for the cage 28 mounted to the main circuit board 24 form a first row of components 110(1) along the X-axis. Similarly, the modules 22 and fiber optic cables 62 for the cage 28 mounted to the daughter card 104 form a second row of components 110(2) along the X-axis. This feature is best seen in FIG. 5. As a result, the multiple rows 110(1), 110(2) form a well-organized, two dimensional array 112 (i.e., a two dimensional array of cavities 40 defined by the cages 28, a two dimensional array of modules 22, and a two dimensional array of cables 62). In the context of two 1×4 cages, the resulting array is a 2×4 cage configuration.

As best seen in FIG. 4, the modules 22 of the second row 110(2) which install (in the positive Z-direction) into the cage 28, which mounts to the daughter card 104, with their bellies 64 and retention posts 54 facing away from the daughter card 104 (i.e., in the negative Y-direction). That is, both the bellies 64 and the retention posts 54 face away from their supporting board and toward the modules 22 of the other row 110(1). As a result, control members of the second row of components 110(2) installing onto the daughter card assembly 100 (i.e., latches/bails of the modules 22, movable flaps 72 of the cables 62, etc.) have the luxury of facing outward toward the daughter card 104 (i.e., the positive Y-direction) and away from the modules 22 of the other row 110(1).

Based on the above, the control members 74 of the second row of components 110(2) face outward (in the positive Y-direction) and away from the first row of components 110(1). Similarly, the control members 74 of the first row of components 110(1) face outward (in the negative Y-direction) and away from the second row of components 110(2) (see FIG. 5). Accordingly, easy and convenient access to the control members exists for the circuit board assembly 20 in the high density configuration of FIGS. 4 and 5. For example, the control levers 74 (e.g., latches or bails) of the modules 22 of the second row 110(2) conveniently actuate in a direction toward the circuit board 24 (i.e., the negative Y-direction) and thus are very easy to maneuver from the daughter card 104 side. Similarly, the control levers of the modules 22 of the first row 110(1) conveniently actuate in a direction toward the daughter card 104 (i.e., the positive Y-direction) and thus are very easy to maneuver from the circuit board 24 side.

It should be understood that there are variety of standardized pluggable transceiver modules that are capable of utilizing the above-described techniques. For example, the above-described circuit board assembly 20 is capable of being implemented for Improved Pluggable Formfactor (IPF) modules as specified by the SFF-8432 Specification, Revision 3.9, the teachings of which are hereby incorporated by reference in their entirety.

As mentioned above, an improved cage 28 is constructed and arranged to hold a pluggable transceiver module 22 in a reverse orientation, e.g., upside down so that the belly 64 and the retention post 54 of the pluggable transceiver module 22 faces away from the circuit board 24. With such an improved cage 28 in combination with an appropriate electrical connector 26, a two dimensional array of pluggable transceiver modules 22 can be conveniently sandwiched between a motherboard (i.e., the circuit board 30) and a daughter card 104. In particular, both the latches 74 of the modules 22 and the movable flaps 72 of the cables 62 would then face away from each other for easy access and actuation. Moreover, circuit board real estate on the opposite sides of the motherboard and the daughter card would be available for convenient location high speed circuitry.

While various embodiments of the invention have been particularly shown and described, it will be understood by those skilled in the art that various changes in form and details may be made therein without departing from the spirit and scope of the invention as defined by the appended claims.

What is claimed is:

1. A circuit board assembly, comprising:
   a circuit board;
   a pluggable transceiver module connector constructed and arranged to electrically connect with a pluggable transceiver module including a first end supporting a retention post, the pluggable transceiver module connector being supported on and spaced from the circuit board a sufficient distance to electrically connect with an electrical interface portion disposed on a second end of the pluggable transceiver module, a portion of the second end of the luggable transceiver module extending underneath the electrical interface portion into the space between the circuit board and the connector; and
   a cage supported by the circuit board, the cage including:
   a cage body defining (i) a circuit board side which faces the circuit board, (ii) an opposing side which faces away from the circuit board, and (iii) a cavity within which the pluggable transceiver module substantially resides during module operation, the pluggable transceiver module connector being substantially disposed within the cavity,
   a set of electrical contacts disposed along the circuit board side defined by the cage body, the set of electrical contacts mechanically mounting and electrically connecting the cage body to the circuit board, and
   a tab constructed and arranged to engage the retention post of the pluggable transceiver module when the pluggable transceiver module substantially resides within the cavity defined by the cage body, the tab residing on the opposing side defined by the cage body and being movable between a position engaged with the retention post and a position disengaged from the retention post.

2. A circuit board assembly as in claim 1 wherein the cage body defines, as the cavity within which the pluggable transceiver module substantially resides during module operation, a dimensioned space to securely receive an Improved Pluggable Formfactor (IPF) module as specified by the SFF-8432 Specification, Revision 3.9.

3. A circuit board assembly as in claim 2 wherein the IPF module has (i) an elongated housing which defines an axis, (ii) an optical interface portion disposed at first end of the elongated housing, (iii) an electrical interface portion disposed at a second end of the elongated housing which is substantially opposite the first end, the electrical interface portion being constructed and arranged to electrically interface with the pluggable transceiver module connector, and (iv) a control lever which is attached to the optical interface portion and configured to receive actuation at an actuation location, the control lever being constructed and arranged to effectuate disengagement of the retention post from the tab during actuation; and
   wherein the actuation location is adjacent to the circuit board side and distal to the opposing side defined by the cage body when the IPF module substantially resides within the dimensioned space.

4. A circuit board assembly as in claim 1 wherein the set of electrical contacts disposed along the circuit board side of the cage body includes:
   multiple compression fit pins which are integrally formed with the cage body, the multiple compression fit pins extending from the circuit board side of the cage body and mating with respective plated through holes of the circuit board.

5. A circuit board assembly as in claim 1 wherein the cage body defines a row of multiple cavities within which a row of multiple pluggable transceiver modules substantially resides during module operation.

6. A circuit board assembly as in claim 1 wherein the pluggable transceiver module defines a top surface and a bottom surface which is opposite the top surface;
   wherein the retention post resides on the top surface and extends away from the pluggable transceiver module; and
   wherein the pluggable transceiver module connector is constructed and arranged to electrically connect with the pluggable transceiver module when the retention post extends away from the circuit board and when the pluggable transceiver module substantially resides within the cavity defined by the cage body during module operation.

7. A circuit board assembly as in claim 6, further comprising:
   a daughter card supported by the circuit board, the cage being disposed between the circuit board and the daughter card.

8. A circuit board assembly as in claim 7, further comprising:
   another cage supported by the daughter card, the cage supported by the circuit board and the other cage supported by the daughter card defining a two dimensional array of cavities within which a two dimensional array of pluggable transceiver modules substantially resides during module operation.

9. A circuit board assembly as in claim 8 wherein the two dimensional array of pluggable transceiver modules includes a first row of pluggable transceiver modules adjacent the circuit board, and a second row of pluggable transceiver modules adjacent the daughter card;

wherein each pluggable transceiver module has a retention post;

wherein the cage supported by the circuit board is constructed and arranged to position the first row of pluggable transceiver modules in a manner in which the retention posts of the pluggable transceiver modules of the first row extend away from the circuit board and toward the second row of pluggable transceiver modules and the daughter card; and wherein the cage supported by the daughter card is constructed and arranged to position the second row of pluggable transceiver modules in a manner in which the retention posts of the pluggable transceiver modules of the second row extend away from the daughter card and toward the first row of pluggable transceiver modules and the circuit board.

10. A circuit board assembly, comprising:

a circuit board;

a pluggable transceiver module connector supported by the circuit board, the pluggable transceiver module connector being constructed and arranged to electrically connect with a pluggable transceiver module having a retention post, a top surface and a bottom surface which is opposite the top surface, wherein the retention post resides on the top surface and extends away from the pluggable transceiver module; and a cage supported by the circuit board, the cage including:
　a cage body defining (i) a circuit board side which faces the circuit board, (ii) an opposing side which faces away from the circuit board, and (iii) a cavity within which the pluggable transceiver module substantially resides during module operation, the pluggable transceiver module connector being substantially disposed within the cavity;
　a set of electrical contacts disposed along the circuit board side defined by the cage body, the set of electrical contacts mechanically mounting and electrically connecting the cage body to the circuit board;
　a tab constructed and arranged to engage the retention post of the pluggable transceiver module when the pluggable transceiver module substantially resides within the cavity defined by the cage body, the tab residing on the opposing side defined by the cage body;

wherein the pluggable transceiver module connector is constructed and arranged to electrically connect with the pluggable transceiver module when the retention post extends away from the circuit board and when the pluggable transceiver module substantially resides within the cavity defined by the cage body during module operation; and a daughter card supported by the circuit board, the cage being disposed between the circuit board and the daughter card;

another cage supported by the daughter card;

the cage supported by the circuit board and the other cage supported by the daughter card defining a two dimensional array of cavities within which a two dimensional array of pluggable transceiver modules substantially resides during module operation; and wherein the two dimensional array of pluggable transceiver modules includes a first row of pluggable transceiver modules adjacent the circuit board, and a second row of pluggable transceiver modules adjacent the daughter card;

wherein each pluggable transceiver module has a retention post and a control lever which is constructed and arranged to effectuate disengagement of the retention post from a respective tab of the cage body during actuation;

wherein the cage supported by the circuit board is constructed and arranged to position the first row of pluggable transceiver modules in a manner in which the control levers of the pluggable transceiver modules of the first row actuate in a direction toward the circuit board; and wherein the cage supported by the daughter card is constructed and arranged to position the second row of pluggable transceiver modules in a manner in which the control levers of the pluggable transceiver modules of the second row actuate in a direction toward the daughter card.

11. A cage assembly to support a first and a second row of pluggable transceiver modules each pluggable transceiver module having a retention post, the cage assembly comprising:

a cage supported by a circuit board, the cage including:
　a cage body defining (i) a circuit board side to face a circuit board when the cage mounts to the circuit board, (ii) an opposing side to face away from the circuit board when the cage mounts to the circuit board, and (iii) a cavity within which the pluggable transceiver module of the first row substantially resides during module operation;
　a set of electrical contacts disposed along the circuit board side defined by the cage body, the set of electrical contacts being constructed and arranged to mechanically mount and electrically connect the cage body to the circuit board;
　a tab constructed and arranged to engage the retention post of the pluggable transceiver module when the pluggable transceiver module substantially resides within the cavity defined by the cage body, the tab residing on the opposing side defined by the cage body and being movable between a position engaged with the retention post and a position disengaged from the retention post;

a second cage supported by a daughter card spaced from the circuit board, the second cage including:
　a second cage body defining (i) a daughter card side to face the daughter card when the second cage mounts to the daughter card, (ii) an opposing side to face away from the daughter card when the second cage mounts to the daughter card, and (iii) a cavity within which the pluggable transceiver module of the second row substantially resides during module operation;
　a second set of electrical contacts disposed along the daughter card side defined by the second cage body, the second set of electrical contacts being constructed and arranged to mechanically mount and electrically connect the second cage body to the daughter card;
　a second tab constructed and arranged to engage the retention post of the pluggable transceiver module when the pluggable transceiver module substantially resides within the cavity defined by the second cage body, the second tab residing on the opposing side defined by the second cage body and being movable between a position engaged with the retention post and a position disengaged from the retention post;

wherein the cage supported by the circuit board is constructed and arranged to position the first row of pluggable transceiver modules in a manner in which control levers of the pluggable transceiver modules of the first row actuate in a direction toward the circuit board; and wherein the second cage supported by the daughter card is constructed and arranged to position the second row of pluggable transceiver modules in a manner in which control levers of the pluggable transceiver modules of the second row actuate in a direction toward the daughter card.

12. The cage assembly as in claim 11 wherein the cage body of each of the cage and second cage defines, as the cavity within which the pluggable transceiver module substantially resides during module operation, a dimensioned space to securely receive an Improved Pluggable Formfactor (IPF) module as specified by the SFF-8432 Specification, Revision 3.9.

13. The cage assembly as in claim 12 wherein each IPF module has (i) an elongated housing which defines an axis, (ii) an optical interface portion disposed at first end of the elongated housing, (iii) an electrical interface portion disposed at a second end of the elongated housing which is substantially opposite the first end, and (iv) a control lever which is attached to the optical interface portion and configured to receive actuation at an actuation location, the control lever being constructed and arranged to effectuate disengagement of the retention post from the tab during actuation;

wherein the actuation location is adjacent to the circuit board side and distal to the opposing side defined by the cage body when the IPF module substantially resides within the dimensioned space of the cage; and wherein the actuation location is adjacent to the daughter card side and distal to the opposing side defined by the cage body when the IPF module substantially resides within the dimensioned space of the second cage.

14. The cage assembly as in claim 11 wherein the set of electrical contacts disposed along the circuit board side of the cage body includes multiple compression fit pins which are integrally formed with the cage body, the multiple compression fit pins extending from the circuit board side of the cage body and being constructed and arranged to mate with respective plated through holes of the circuit board; and wherein the second set of electrical contacts disposed along the daughter card side of the second cage body includes multiple compression fit pins which are integrally formed with the second cage body, the multiple compression fit pins extending from the daughter card side of the second cage body and being constructed and arranged to mate with respective plated through holes of the daughter card.

15. The cage assembly as in claim 11 wherein each cage body defines a row of multiple cavities within which a row of multiple pluggable transceiver modules substantially resides during module operation.

* * * * *